Patented Aug. 13, 1940

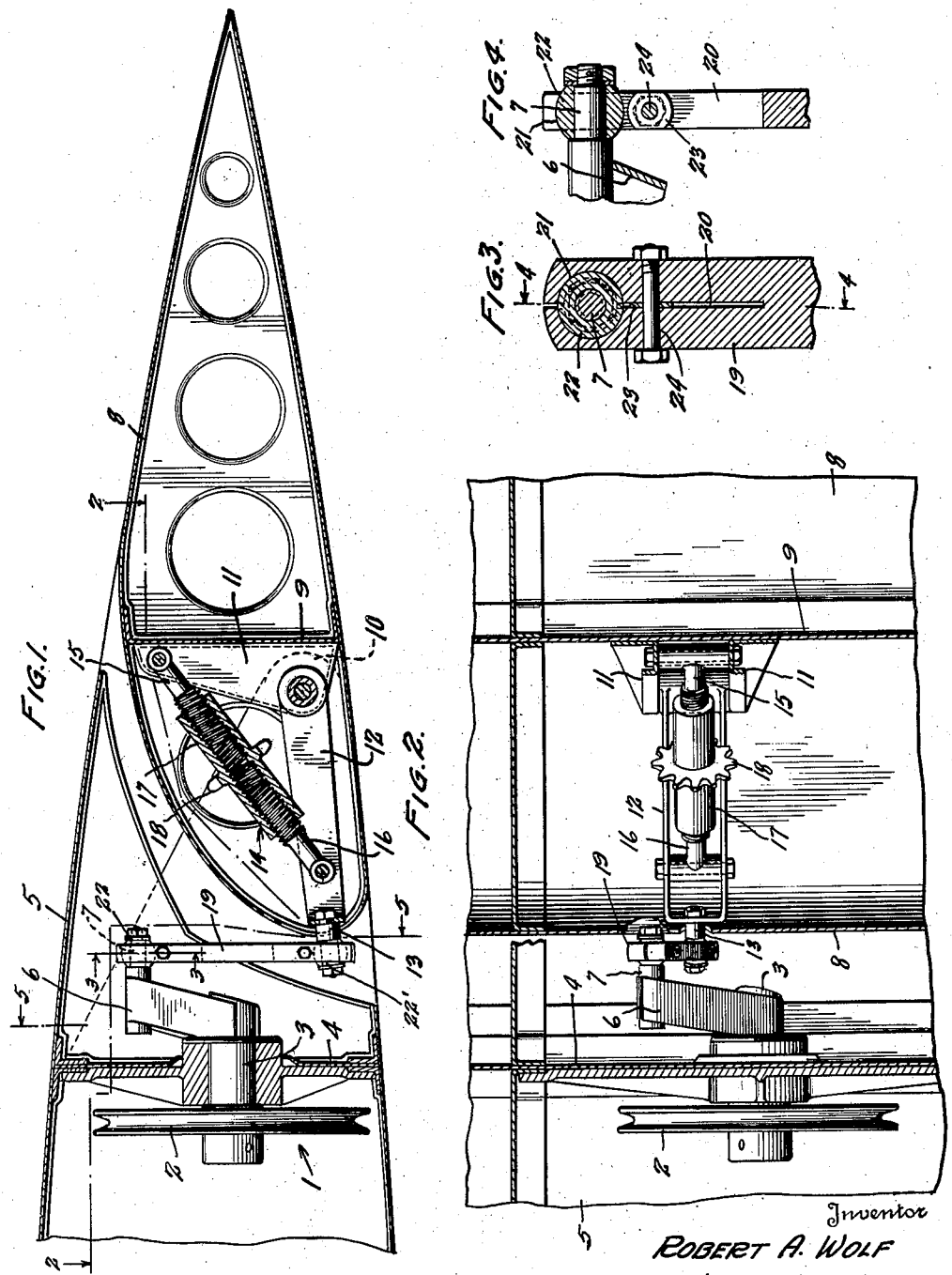

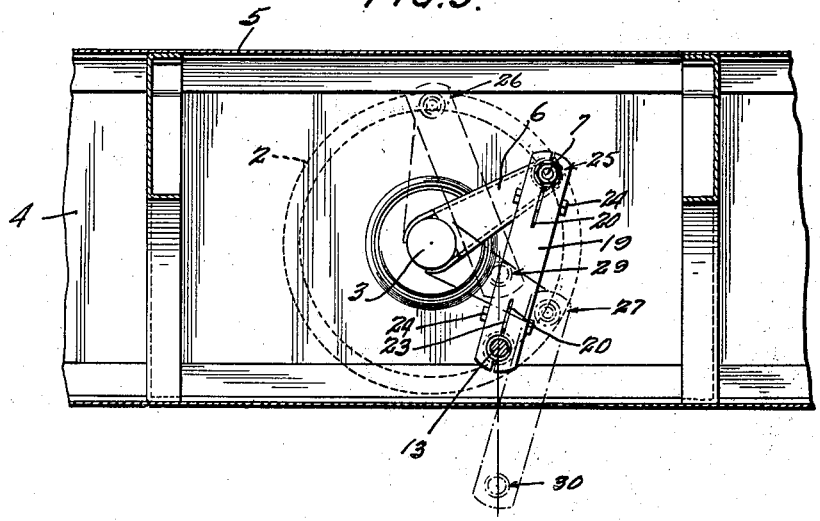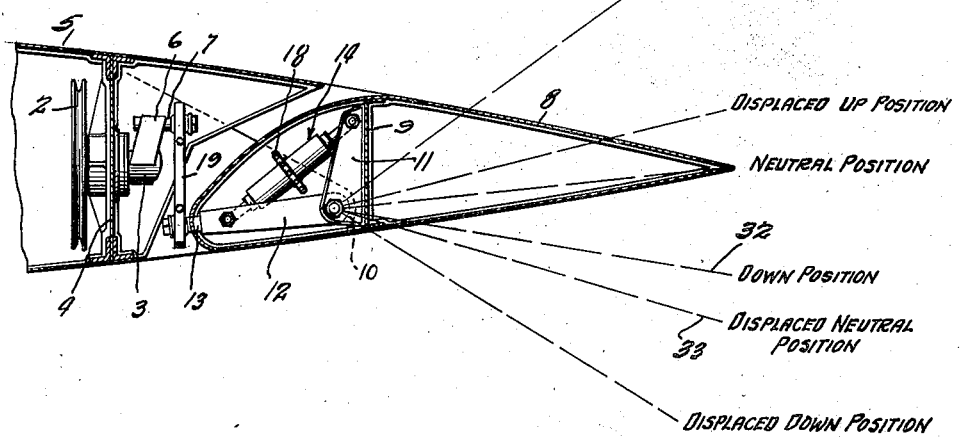

2,211,307

UNITED STATES PATENT OFFICE 2,211,307

CONTROL SURFACE OPERATING UNIT

Robert A. Wolf and Herbert L. Bowers, Kenmore, N. Y., assignors to Bell Aircraft Corporation, Buffalo, N. Y., a corporation of New York Application December 1, 1938, Serial No. 243,424

6 Claims. (Cl. 244—83)

This invention relates to a unit for operating control surfaces of airplanes, and more especially to a control unit, the construction of which makes possible not only a differential angular movement of the control surface in respect to the airfoil, but also a variation of the position of the control surface in respect to the control unit without affecting the normal operation of the control surface, while the airplane is in flight.

One of the objects of our invention is to provide a device, by the primary operation of which a control surface of an airplane may be differentially brought into angular relationship with either the upper or lower surface of the airfoil to which it is attached.

Another object of our invention is to provide means whereby the normal or neutral position of the control surface with respect to the airfoil may be varied while the airplane is in flight, thereby varying the camber of the airfoil without modifying the normal effect of the control surface upon the said airfoil.

A further object of our invention is to provide a method whereby the operative relation of the control surface in respect to its control unit may be varied while the airplane is in flight, without interfering with the normal angular operation of the control surface.

With these and other objects in view, our invention embraces the concept of a control unit which is provided with means whereby an angular movement may be imparted to a control surface of an airplane in such a manner that the control surface may be differentially moved either upwardly or downwardly. Means connected with the operating unit are also provided whereby the normal angular relationship between the control surface and the control unit may be varied, thereby changing the camber of the airfoil without interfering with the normal operation of the control unit.

In the drawings:

Figure 1 discloses a transverse sectional view of a control surface connected to a fragment of an airfoil.

Figure 2 is a view taken along line 2—2 of Figure 1, looking in the direction of the arrows.

Figure 3 is a view taken along line 3—3 of Figure 1, looking in the direction of the arrows.

Figure 4 is a view taken along line 4—4 of Figure 3, looking in the direction of the arrows.

Figure 5 is a view taken along line 5—5 of Figure 1, diagrammatically showing the differential crank in selective positions.

Figure 6 is a view similar to that disclosed in Figure 1, diagrammatically indicating the various positions which can be assumed by the control surface.

As best shown in Figure 1, our invention consists of a control operating unit, generally indicated by the numeral 1, which is provided with a pulley 2 mounted on a shaft 3. The shaft 3 is journaled in a cross beam 4 which is a structural member of an airfoil 5 of an airplane. A differential crank 6 having a crank pin 7 is mounted on the opposite end of the shaft 3.

The control surface 8, which is of any convenient design, and provided with a longitudinal beam 9, is hinged to the airfoil 5 as indicated at 10. Attached to the beam 9 is a bracket 11 upon which is movably mounted an arm 12, the opposite extremity of which is provided with a pin 13 which protrudes through the leading edge of the control surface 8.

An extensible link 14 connects the bracket 11 to the arm 12. This link is composed of a threaded rod 15, one extremity of which is pivotally attached to the bracket 11 and an oppositely threaded rod 16 which is pivotally attached to the arm 12. These rods are threaded within a sleeve 17 which is provided with a concentric sprocket or other rotating means 18. Connecting the crank 6 with the arm 12 to provide for a universal angular relation between them is a link 19.

As best shown in Figures 3 and 4, the link 19 consists of a connecting rod, the extremities of which are split as shown at 20. Each of these split sections is provided with a socket 21. Each of the sockets 21 is constructed to receive balls 22 and 22' which are rotatively mounted on the pins 7 and 13, respectively. Adjustments such as shims 23 and bolts 24 may be provided to insure proper operating fits.

The pulley 2 is connected to the control column of the airplane by suitable cable or crank linkages, not shown, and the concentric sprocket 18 is also connected in any suitable manner as by chain and cable, not shown, to a device which is under the control of the pilot of the airplane.

In operation, a movement of the differential crank 6 will impart, through the link 19 and the arm 12, and extensible link 14, an angular motion to the control surface 8. This angular motion may be in either an upwardly or downwardly direction.

As best shown in Figure 5, the operation of the crank 6 will impart a differential motion to the control surface 8. Thus the movement of the crank 6 from the neutral position shown at 25 through equal angles in either direction as shown at 26 and 27 will result in an unequal movement of the control surface 8 as indicated at 29 and 30.

This differential movement is also indicated in Figure 6 where the angle between the neutral position of the control surface 8 and the maximum raised position as indicated at 31 is much larger than the maximum down position shown at 32, although both movements resulted from equal angular movements of the crank 6 as shown in Figure 5.

In addition to this primary operation of the control surface, its position in relation to the arm 12 or in other words, its normal position relative to the airfoil 5, may be varied by the operation of the concentric sprocket 18. This change in position results in variations in the camber of the airfoil 5.

The operation of the sprocket 18 causes this change in position by actuating the sleeve 17 in such a manner as to cause it to either draw the rods 15 and 16 together or force them apart. In either case, the angular relationship between the bracket 11 and the arm 12 is changed because of the change in position of the bracket 11, and the position of the control surface 8 is thereby varied in respect to the airfoil 5 without necessitating a movement of the crank 6.

In order to illustrate this feature of our invention, a diagrammatic representation of some of the various positions that can be assumed by the control surface has been shown in Figure 6. In this figure, the control surface is shown in neutral position and maximum operation of the crank 6 will result in either a differential angular movement upwardly to the up position indicated at 31 or a movement from the neutral position to the down position shown at 32 as has previously been described. If the sprocket 18 is rotated so as to force the rods 15 and 16 further apart, the position of the control surface 8 may be lowered until it reaches the displaced neutral position shown at 33. In this position, the camber of the airfoil 5 is increased and the control surface 8 may still be differentially moved upwardly or downwardly from this position by operation of the crank 6.

In this manner the setting of the control surface 8 in respect to the airfoil 5 can be varied by the manipulation of the extensible link 14 while the airplane is in flight. By a change in the neutral setting of the control surface in this manner, an added effect is given to the operation of the crank 6.

While for purposes of illustration we have shown one mechanism for the angular displacement of the control surface of an airplane relative to its neutral position without loss of differential control during the transition, it is obvious that the concept of our invention is broader than that disclosed in the drawings which are for purposes of illustration, and the various mechanical equivalents can be substituted for the pulleys, gearings, and linkages shown. Moreover, while we have shown the operation of an aileron for the operation of our device, it is obvious that our invention can be used with slight modifications to operate any control surfaces of an airplane, such as elevators, fins, stabilizers, or tabs.

For the reasons stated above, we do not intend that the concept of our invention be limited by the illustration, but only by the prior art and the scope of the appended claims.

We claim:

1. In an airplane construction, an airfoil, a control surface provided with a structural support mounted on said airfoil, rotative means mounted within the airfoil, said means being adapted to impart an angular motion to the said control surface, and a differential control mechanism mounted entirely within the control surface, said control mechanism consisting of a member pivotally mounted on the structural support for the control surface, and an adjustable means rigidly connecting the said member to the said structural support, said adjustable means being adapted when operated to vary the angular relationship between the member and the structural support, thereby varying the angular relationship between the control surface and the main arifoil, and means connecting said member to said rotative means whereby an angular motion may be imparted to the control surface.

2. In an airplane construction, an airfoil, a control surface provided with a structural support mounted on said airfoil, rotative means mounted within the airfoil, said means being adapted to impart an angular motion to the said control surface, and a differential control mechanism mounted entirely within the control surface, said control mechanism consisting of a member pivotally mounted on the structural support for the control surface, and a means the length of which is adjustable connecting the said member to the said structural support in such a manner that an adjustment of the length of the adjustable means will vary the angular relationship between the member and the support thereby varying the angular relationship between the control surface and the main airfoil, and means connecting said member to said rotative means mounted in the airfoil, whereby an angular motion may be imparted to the control surface.

3. In an airplane construction, an airfoil, a control surface provided with a structural support mounted on said airfoil, rotative means mounted within the airfoil, said means being adapted to impart an angular motion to the said control surface, and a differential control mechanism mounted entirely within the control surface, said control mechanism consisting of an arm pivotally mounted on the structural support for the control surface, and a means the length of which is adjustable connecting the said arm to the said structural support in such a manner that an adjustment of the length of the adjustable means will vary the angular relationship between the arm and the support thereby varying the angular relationship between the control surface and the main airfoil, and means connecting said arm to the said rotative means mounted in the airfoil whereby an angular motion may be imparted to the control surface.

4. In an airplane construction, an airfoil, a control surface provided with a structural support mounted on said airfoil, rotative means mounted within the airfoil, said means being adapted to impart an angular motion to the said control surface, and a differential control mechanism mounted entirely within the control surface, said control mechanism consisting of a member pivotally mounted on the structural support for the control surface, and an adjustable link consisting of two shanks one of which is mounted on the said member and the other on the support, means to vary the distance between the said shanks so as to vary the angular relationship between the member and the support thereby varying the angular relationship between the control surface and the main airfoil, and rigid means connecting the said member to the said rotative means mounted in the airfoil, whereby an angular motion may be imparted to the control surface.

5. In an airplane construction, an airfoil, a control surface provided with a structural support mounted on said airfoil, rotative means mounted within the airfoil, said means being adapted to impart an angular motion to the said control surface, and a differential control mechanism mounted entirely within the control surface, said control mechanism consisting of an arm pivotally mounted on the structural support for the control surface, and an adjustable link consisting of two shanks one of which is mounted on the said arm and the other on the support, means to vary the distance between the said shanks so as to vary the angular relationship between the arm and the support thereby varying the angular relationship between the control surface and the main airfoil, and rigid means connecting the said arm to the said rotative means mounted in the airfoil, whereby an angular motion may be imparted to the control surface.

6. In an airplane construction, an airfoil, provided with a supporting structure, a control surface provided with a structural support mounted on said airfoil, rotative means mounted within the airfoil and journaled in the airfoil structure, said means being adapted to impart an angular motion to the said control surface, and a differential control mechanism mounted entirely within the control surface, said control mechanism consisting of an arm pivotally mounted on the structural support for the control surface, and an adjustable means consisting of two shanks, one of which is mounted on the said arm and the other on the structural support of the control surface, said shanks being joined by a sleeve in such a manner that the rotation of the sleeve will vary the distance separating the said shanks thereby varying the angular relationship between the arm and the support in order to vary the angular relationship between the control surface and the main airfoil, and a crank arm connecting the arm to the said rotative means mounted in the airfoil, whereby an angular motion may be imparted to the control surface.

HERBERT L. BOWERS.
ROBERT A. WOLF.